(12) United States Patent
Hussain et al.

(10) Patent No.: US 9,294,567 B2
(45) Date of Patent: Mar. 22, 2016

(54) SYSTEMS AND METHODS FOR ENABLING ACCESS TO EXTENSIBLE STORAGE DEVICES OVER A NETWORK AS LOCAL STORAGE VIA NVME CONTROLLER

(71) Applicant: CAVIUM, INC., San Jose, CA (US)

(72) Inventors: Muhammad Raghib Hussain, Saratoga, CA (US); Vishal Murgai, Cupertino, CA (US); Manojkumar Panicker, Sunnyvale, CA (US); Faisal Masood, San Jose, CA (US); Brian Folsom, Northborough, MA (US); Richard Eugene Kessler, Northborough, MA (US)

(73) Assignee: CAVIUM, INC., San Jose, CA (US)

( * ) Notice: Subject to any disclaimer, the term of this patent is extended or adjusted under 35 U.S.C. 154(b) by 94 days.

(21) Appl. No.: 14/300,552

(22) Filed: Jun. 10, 2014

(65) Prior Publication Data
US 2015/0319237 A1    Nov. 5, 2015

Related U.S. Application Data

(60) Provisional application No. 61/987,956, filed on May 2, 2014.

(51) Int. Cl.
*G06F 3/06* (2006.01)
*H04L 29/08* (2006.01)
*G06F 9/455* (2006.01)
(Continued)

(52) U.S. Cl.
CPC ............ *H04L 67/1097* (2013.01); *G06F 3/065* (2013.01); *G06F 3/067* (2013.01); *G06F 3/0611* (2013.01); *G06F 3/0662* (2013.01); *G06F 3/0665* (2013.01); *G06F 3/0683* (2013.01); *G06F 3/0685* (2013.01); *G06F 3/0689* (2013.01); *G06F 9/45533* (2013.01); *G06F 9/45558* (2013.01); *H04L 41/0866* (2013.01); *H04L 43/04* (2013.01); *H04L 67/1095* (2013.01); *G06F 2009/45583* (2013.01); *G06F 2009/45587* (2013.01)

(58) Field of Classification Search
CPC ..... G06F 3/0662; G06F 3/0665; G06F 3/067; G06F 3/0683; G06F 3/0685; G06F 3/0689; G06F 3/0626; G06F 3/0622; G06F 3/0617; G06F 3/0604; G06F 9/45558; G06F 9/45533; G06F 9/5072; G06F 13/1642; H04L 67/1097
See application file for complete search history.

(56) References Cited

U.S. PATENT DOCUMENTS

| 5,329,318 A | 7/1994 | Keith |
|---|---|---|
| 6,990,395 B2 | 1/2006 | Ransom |
| 8,239,655 B2 | 8/2012 | Goggin et al. |

(Continued)

*Primary Examiner* — Le H Luu
(74) *Attorney, Agent, or Firm* — Duane Morris LLP; David T. Xue

(57) ABSTRACT

A new approach is proposed that contemplates systems and methods to support extensible/flexible storage access in real time by virtualizing a plurality of remote storage devices as NVMe namespace(s) via an NVMe controller using a storage network protocol. The NVMe controller exports and presents the remote storage devices to one or more VMs running on a host attached to the NVMe controller as the NVMe namespace(s), wherein these remote storage devices appear virtually as one or more logical volumes of a collection of logical blocks in the NVMe namespace(s) to the VMs. As a result, each of the VMs running on the host can access these remote storage devices to perform read/write operations as if they were local storage devices via the NVMe namespace(s).

28 Claims, 5 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 8,291,135 B2 | 10/2012 | Subramanian et al. | |
| 8,756,441 B1 | 6/2014 | Mullins | |
| 9,098,214 B1 | 8/2015 | Vincent et al. | |
| 2009/0037680 A1* | 2/2009 | Colbert | G06F 3/0617 711/162 |
| 2009/0307388 A1* | 12/2009 | Tchapda | G06F 13/1642 710/33 |
| 2010/0082922 A1 | 4/2010 | George et al. | |
| 2010/0325371 A1 | 12/2010 | Jagadish | |
| 2012/0042033 A1 | 2/2012 | Ayala | |
| 2012/0042034 A1 | 2/2012 | Goggin | |
| 2012/0110259 A1 | 5/2012 | Mills | |
| 2012/0150933 A1 | 6/2012 | Boersma | |
| 2013/0014103 A1 | 1/2013 | Reuther et al. | |
| 2013/0042056 A1 | 2/2013 | Shats | |
| 2013/0097369 A1 | 4/2013 | Talagala | |
| 2013/0191590 A1 | 7/2013 | Malwankar | |
| 2013/0198312 A1 | 8/2013 | Tamir | |
| 2013/0204849 A1* | 8/2013 | Chacko | G06F 3/0604 707/692 |
| 2013/0318197 A1 | 11/2013 | Plaisted | |
| 2014/0007189 A1* | 1/2014 | Huynh | G06F 3/0622 726/3 |
| 2014/0059226 A1* | 2/2014 | Messerli | G06F 9/5072 709/226 |
| 2014/0089276 A1 | 3/2014 | Satish | |
| 2014/0173149 A1* | 6/2014 | Walker | G06F 9/45533 710/263 |
| 2014/0195634 A1 | 7/2014 | Kishore et al. | |
| 2014/0282521 A1* | 9/2014 | Lango | G06F 9/45533 718/1 |
| 2014/0317206 A1* | 10/2014 | Lomelino | H04L 67/1097 709/206 |
| 2015/0120971 A1* | 4/2015 | Bae | G06F 3/0626 710/106 |
| 2015/0234617 A1 | 8/2015 | Li et al. | |

\* cited by examiner

| Namespace(s)/Logical volume(s) | Remote physical storage volumes |
|---|---|
| Ns_1 | Vol_1 |
| Ns_2 | Vol_2 |
| Ns_2 | Vol_3 |
| Ns_m | Vol_n |

FIG. 3

SYSTEMS AND METHODS FOR ENABLING ACCESS TO EXTENSIBLE STORAGE DEVICES OVER A NETWORK AS LOCAL STORAGE VIA NVME CONTROLLER

CROSS-REFERENCE TO RELATED APPLICATIONS

This application claims the benefit of U.S. Provisional Patent Application No. 61/987,956, filed May 2, 2014 and entitled "Systems and methods for accessing extensible storage devices over a network as local storage via NVMe controller," which is incorporated herein in its entirety by reference.

This application is related to co-pending U.S. patent application Ser. No. 14/279,712, filed May 16, 2014 and entitled "Systems and methods for NVMe controller virtualization to support multiple virtual machines running on a host," which is incorporated herein in its entirety by reference.

BACKGROUND

Service providers have been increasingly providing their web services (e.g., web sites) at third party data centers in the cloud by running a plurality of virtual machines (VMs) on a host/server at the data center. Here, a VM is a software implementation of a physical machine (i.e. a computer) that executes programs to emulate an existing computing environment such as an operating system (OS). The VM runs on top of a hypervisor, which creates and runs one or more VMs on the host. The hypervisor presents each VM with a virtual operating platform and manages the execution of each VM on the host. By enabling multiple VMs having different operating systems to share the same host machine, the hypervisor leads to more efficient use of computing resources, both in terms of energy consumption and cost effectiveness, especially in a cloud computing environment.

Non-volatile memory express, also known as NVMe or NVM Express, is a specification that allows a solid-state drive (SSD) to make effective use of a high-speed Peripheral Component Interconnect Express (PCIe) bus attached to a computing device or host. Here the PCIe bus is a high-speed serial computer expansion bus designed to support hardware I/O virtualization and to enable maximum system bus throughput, low I/O pin count and small physical footprint for bus devices. NVMe typically operates on a non-volatile memory controller of the host, which manages the data stored on the non-volatile memory (e.g., SSD) and communicates with the host. Such an NVMe controller provides a command set and feature set for PCIe-based SSD access with the goals of increased and efficient performance and interoperability on a broad range of enterprise and client systems. The main benefits of using an NVMe controller to access PCIe-based SSDs are reduced latency, increased Input/Output (I/O) operations per second (IOPS) and lower power consumption, in comparison to Serial Attached SCSI (SAS)-based or Serial ATA (SATA)-based SSDs through the streamlining of the I/O stack.

Currently, a VM running on the host can access the PCIe-based SSDs via the physical NVMe controller attached to the host and the number of storage volumes the VM can access is constrained by the physical limitation on the maximum number of physical storage units/volumes that can be locally coupled to the physical NVMe controller. Since the VMs running on the host at the data center may belong to different web service providers and each of the VMs may have its own storage needs that may change in real time during operation and are thus unknown to the host, it is impossible to predict and allocate a fixed amount of storage volumes ahead of time for all the VMs running on the host that will meet their storage needs. It is thus desirable to be able to provide storage volumes to the VMs that are extensible dynamically during real time operation via the NVMe controller.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts a non-limiting example of a lookup table that maps between the NVMe namespaces of the logical volumes and the remote physical storage volumes in accordance with some embodiments.

DETAILED DESCRIPTION

Figure 1:
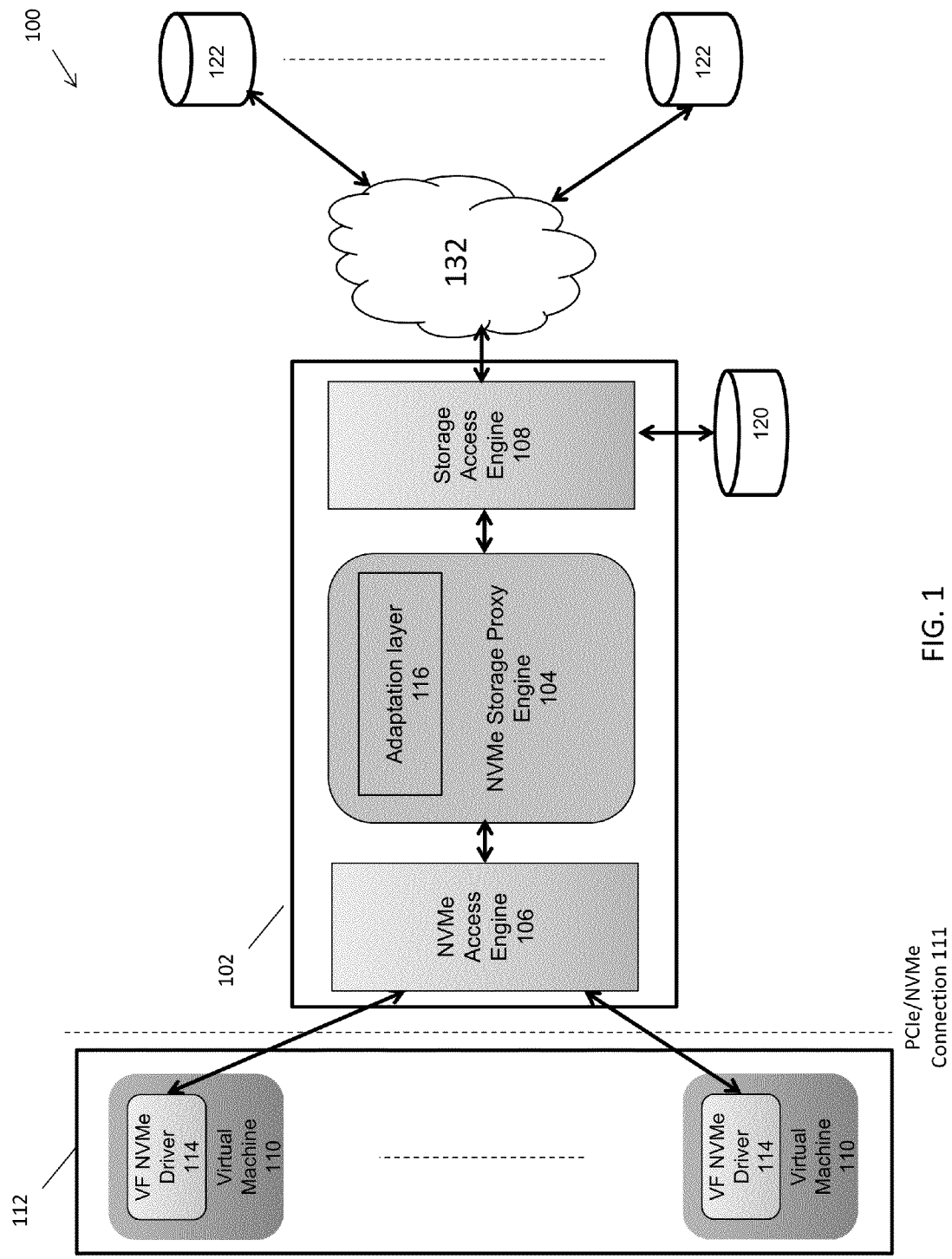
FIG. 1 depicts an example of a diagram of a system to support virtualization of remote storage devices to be presented as local storage devices to VMs in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support extensible/flexible storage access in real time by virtualizing a plurality of remote storage devices as NVMe namespace(s) via an NVMe controller using a storage network protocol. The NVMe controller exports and presents the remote storage devices to one or more VMs running on a host attached to the NVMe controller as the NVMe namespace(s), wherein these remote storage devices appear virtually as one or more logical volumes of a collection of logical blocks in the NVMe namespace(s) to the VMs. As a result, each of the VMs running on the host can access these remote storage devices to perform read/write operations as if they were local storage devices via the NVMe namespace(s).

By virtualizing and presenting the remote storage devices as if they were local disks to the VMs, the proposed approach enables the VMs to expand the storage units available for access from storage devices locally connected to the NVMe controller to remote storage devices accessible over a network, removing any physical limitation on the number of storage volumes accessible by the VMs via the NVMe controller. Under such an approach, every storage device is presented to the VMs as local regardless of whether the storage device is locally attached or remotely accessible and the host of the VMs is enabled to dynamically allocate storage volumes to the VMs in real time based on their actual storage needs during operation instead of pre-allocating the storage volumes ahead of time, which may either be insufficient or result in unused storage space.

FIG. 1 depicts an example of a diagram of system 100 to support virtualization of remote storage devices to be presented as local storage devices to VMs. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a physical NVMe controller 102 having at least an NVMe storage proxy engine 104, NVMe access engine 106 and a storage access engine 108 running on the NVMe controller 102. Here, the physical NVMe controller 102 is a hardware/firmware NVMe module having software, firmware, hardware, and/or other components that are used to effectuate a specific purpose. As discussed in details below, the physical NVMe controller 102 comprises one or more of a CPU or microprocessor, a storage unit or memory (also referred to as primary memory) such as RAM, with software instructions stored for practicing one or more processes. The physical NVMe controller 102 provides both Physical Functions (PFs) and Virtual Functions (VFs) to support the engines running on it, wherein the engines will typically include software instructions that are stored in the storage unit of the physical NVMe controller 102 for practicing one or more processes. As referred to herein, a PF function is a PCIe function used to configure and manage the single root I/O virtualization (SR-IOV) functionality of the controller such as enabling virtualization and exposing PCIe VFs, wherein a VF function is a lightweight PCIe function that supports SR-IOV and represents a virtualized instance of the controller 102. Each VF shares one or more physical resources on the physical NVMe controller 102, wherein such resources include but are not limited to on-controller memory 208, hardware processor 206, interface to storage devices 222, and network driver 220 of the physical NVMe controller 102 as depicted in FIG. 2 and discussed in details below.

In the example of FIG. 1, a computing unit/appliance/host 112 runs a plurality of VMs 110, each configured to provide a web-based service to clients over the Internet. Here, the host 112 can be a computing device, a communication device, a storage device, or any electronic device capable of running a software component. For non-limiting examples, a computing device can be, but is not limited to, a laptop PC, a desktop PC, a mobile device, or a server machine such as an x86/ARM server. A communication device can be, but is not limited to, a mobile phone.

In the example of FIG. 1, the host 112 is coupled to the physical NVMe controller 102 via a PCIe/NVMe link/connection 111 and the VMs 110 running on the host 112 are configured to access the physical NVMe controller 102 via the PCIe/NVMe link/connection 111. For a non-limiting example, the PCIe/NVMe link/connection 111 is a PCIe Gen3 x8 bus.

Figure 2:
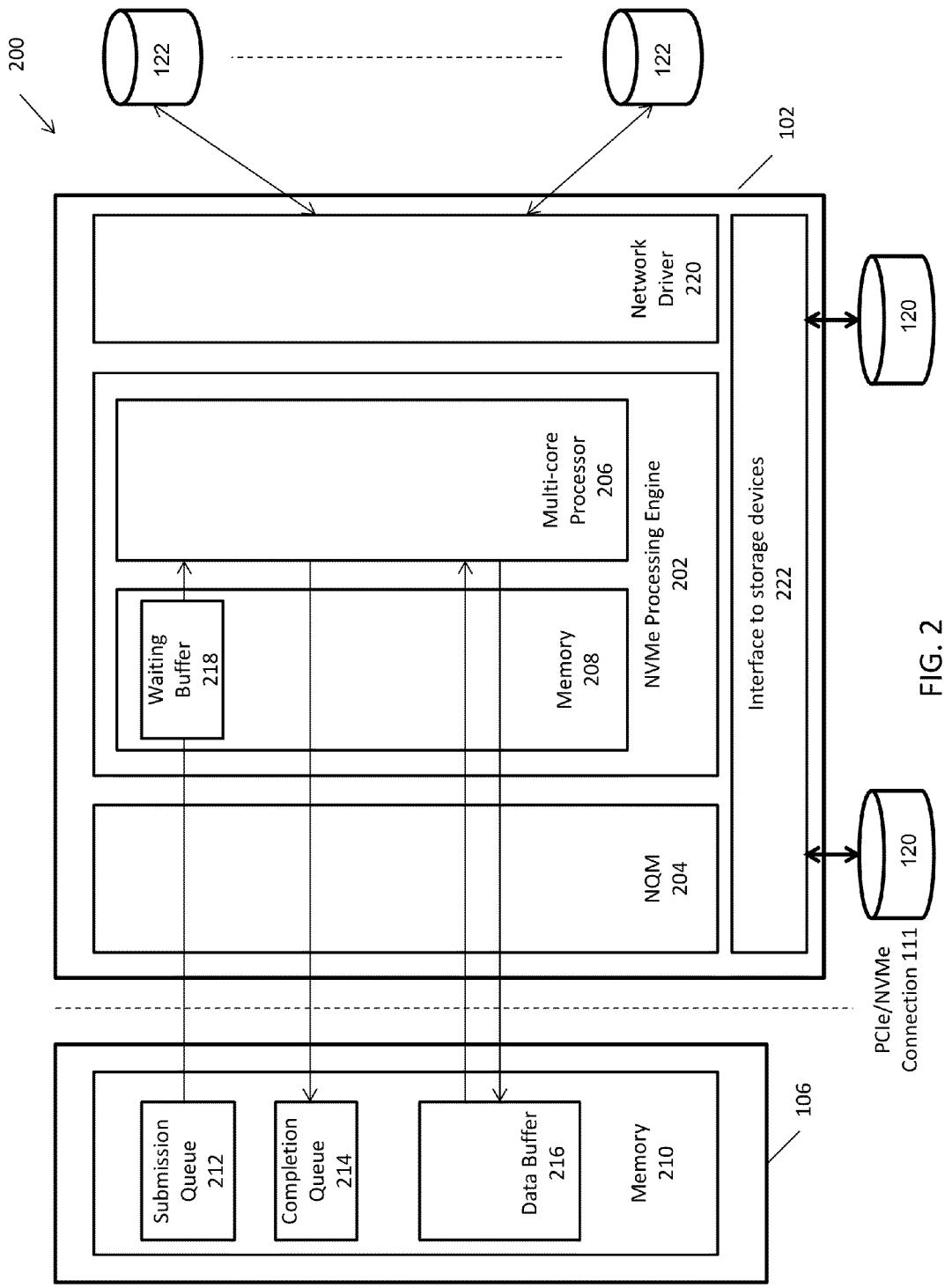
FIG. 2 depicts an example of hardware implementation of the physical NVMe controller depicted in FIG. 1 in accordance with some embodiments.

FIG. 2 depicts an example of hardware implementation 200 of the physical NVMe controller 102 depicted in FIG. 1. As shown in the example of FIG. 2, the hardware implementation 200 includes at least an NVMe processing engine 202, and an NVMe Queue Manager (NQM) 204 implemented to support the NVMe processing engine 202. Here, the NVMe processing engine 202 includes one or more CPUs/processors 206 (e.g., a multi-core/multi-threaded ARM/MIPS processor), and a primary memory 208 such as DRAM. The NVMe processing engine 202 is configured to execute all NVMe instructions/commands and to provide results upon completion of the instructions. The hardware-implemented NQM 204 provides a front-end interface to the engines that execute on the NVMe processing engine 202. In some embodiments, the NQM 204 manages at least a submission queue 212 that includes a plurality of administration and control instructions to be processed by the NVMe processing engine 202 and a completion queue 214 that includes status of the plurality of administration and control instructions that have been processed by the NVMe processing engine 202. In some embodiments, the NQM 204 further manages one or more data buffers 216 that include data read from or to be written to a storage device via the NVMe controllers 102. In some embodiments, one or more of the submission queue 212, completion queue 214, and data buffers 216 are maintained within memory 210 of the host 112. In some embodiments, the hardware implementation 200 of the physical NVMe controller 102 further includes an interface to storage devices 222, which enables a plurality of optional storage devices 120 to be coupled to and accessed by the physical NVMe controller 102 locally, and a network driver 220, which enables a plurality of storage devices 122 to be connected to the NVMe controller 102 remotely of a network.

In the example of FIG. 1, the NVMe access engine 106 of the NVMe controller 102 is configured to receive and manage instructions and data for read/write operations from the VMs 110 running on the host 102. When one of the VMs 110 running on the host 112 performs a read or write operation, it places a corresponding instruction in a submission queue 212, wherein the instruction is in NVMe format. During its operation, the NVMe access engine 106 utilizes the NQM 204 to fetch the administration and/or control commands from the submission queue 212 on the host 112 based on a "doorbell" of read or write operation, wherein the doorbell is generated by the VM 110 and received from the host 112. The NVMe access engine 106 also utilizes the NQM 204 to fetch the data to be written by the write operation from one of the data buffers 216 on the host 112. The NVMe access engine 106 then places the fetched commands in a waiting buffer 218 in the memory 208 of the NVMe processing engine 202 waiting for the NVMe Storage Proxy Engine 104 to process. Once the instructions are processed, The NVMe access engine 106 puts the status of the instructions back in the completion queue 214 and notifies the corresponding VM 110 accordingly. The NVMe access engine 106 also puts the data read by the read operation to the data buffer 216 and makes it available to the VM 110.

In some embodiments, each of the VMs 110 running on the host 112 has an NVMe driver 114 configured to interact with the NVMe access engine 106 of the NVMe controller 102 via the PCIe/NVMe link/connection 111. In some embodiments, each of the NVMe driver 114 is a virtual function (VF) driver configured to interact with the PCIe/NVMe link/connection 111 of the host 112 and to set up a communication path between its corresponding VM 110 and the NVMe access engine 106 and to receive and transmit data associated with the corresponding VM 110. In some embodiments, the VF NVMe driver 114 of the VM 110 and the NVMe access engine 106 communicate with each other through a SR-IOV PCIe connection as discussed above.

In some embodiments, the VMs 110 run independently on the host 112 and are isolated from each other so that one VM 110 cannot access the data and/or communication of any other VMs 110 running on the same host. When transmitting commands and/or data to and/or from a VM 110, the corresponding VF NVMe driver 114 directly puts and/or retrieves the commands and/or data from its queues and/or the data buffer, which is sent out or received from the NVMe access engine 106 without the data being accessed by the host 112 or any other VMs 110 running on the same host 112.

In the example of FIG. 1, the storage access engine 108 of the NVMe controller 102 is configured to access and communicate with a plurality of non-volatile disk storage devices/units, wherein each of the storage units is either (optionally) locally coupled to the NVMe controller 102 via the interface to storage devices 222 (e.g., local storage devices 120), or remotely accessible by the physical NVMe controller 102 over a network 132 (e.g., remote storage devices 122) via the network communication interface/driver 220 following certain communication protocols such as TCP/IP protocol. As referred to herein, each of the locally attached and remotely accessible storage devices can be a non-volatile (non-transient) storage device, which can be but is not limited to, a solid-state drive (SSD), a Static random-access memory (SRAM), a magnetic hard disk drive, and a flash drive. The network 132 can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

In the example of FIG. 1, the NVMe storage proxy engine 104 of the NVMe controller 102 is configured to collect volumes of the remote storage devices accessible via the storage access engine 108 over the network under the storage network protocol and convert the storage volumes of the remote storage devices to one or more NVMe namespaces each including a plurality of logical volumes (a collection of logical blocks) to be accessed by VMs 110 running on the host 112. As such, the NVMe namespaces may cover both the storage devices locally attached to the NVMe controller 102 and those remotely accessible by the storage access engine 108 under the storage network protocol. The storage network protocol is used to access a remote storage device accessible over the network, wherein such storage network protocol can be but is not limited to Internet Small Computer System Interface (iSCSI). iSCSI is an Internet Protocol (IP)-based storage networking standard for linking data storage devices by carrying SCSI commands over the networks. By enabling access to remote storage devices over the network, iSCSI increases the capabilities and performance of storage data transmission over local area networks (LANs), wide area networks (WANs), and the Internet.

In some embodiments, the NVMe storage proxy engine 104 organizes the remote storage devices as one or more logical or virtual volumes/blocks in the NVMe namespaces, to which the VMs 110 can access and perform I/O operations as if they were local storage volumes. Here, each volume is classified as logical or virtual since it maps to one or more physical storage devices either locally attached to or remotely accessible by the NVMe controller 102 via the storage access engine 108. In some embodiments, multiple VMs 110 running on the host 112 are enabled to access the same logical volume or virtual volume and each logical/virtual volume can be shared among multiple VMs. In some embodiments, the virtual volume includes a meta-data mapping table between the logical volume and the remote storage devices 122, wherein the mapping table translates an incoming (virtual) volume identifier and a logical block addressing (LBA) on the virtual volume to one or more corresponding physical disk identifiers and LBAs on the storage devices. In some embodiments, the logical volume may include logical blocks across multiple physical disks in the storage devices.

In some embodiments, the NVMe storage proxy engine 104 establishes a lookup table that maps between the NVMe namespaces of the logical volumes, Ns_1, . . . , Ns_m, and the remote physical storage devices/volumes, Vol_1, . . . , Vol_n, accessible over the network as shown by the non-limiting example depicted in FIG. 3. Here, there is a multiple-to-multiple correspondence between the NVMe namespaces and the physical storage volumes, meaning that one namespace (e.g., Ns_2) may correspond to a logical volume that maps to a plurality of remote physical storage volumes (e.g., Vol_2 and Vol_3), and a single remote physical storage volume may also be included in a plurality of logical volumes and accessible by the VMs 110 via their corresponding NVMe namespaces. In some embodiments, the NVMe storage proxy engine 104 is configured to expand the mappings between the NVMe namespaces of the logical volumes and the remote physical storage devices/volumes to add additional storage volumes on demand. For a non-limiting example, when at least one of the VMs 110 running on the host 112 requests for more storage volumes, the NVMe storage proxy engine 104 may expand the namespace/logical volume accessed by the VM to include additional remote physical storage devices.

In some embodiments, the NVMe storage proxy engine 104 further includes an adaptation layer/shim 116, which is a software component configured to manage message flows between the NVMe namespaces and the remote physical storage volumes. Specifically, when instructions for storage operations (e.g., read/write operations) on one or more logical volumes/namespaces are received from the VMs 110 via the NVMe access engine 106, the adaptation layer/shim 116 converts the instructions under NVMe specification to one or more corresponding instructions on the remote physical storage volumes under the storage network protocol such as iSCSI according to the lookup table. Conversely, when results and/or feedbacks on the storage operations performed on the remote physical storage volumes are received via the storage access engine 108, the adaptation layer/shim 116 also converts the results to feedbacks about the operations on the one or more logical volumes/namespaces and provides such converted results to the VMs 110.

In the example of FIG. 1, the NVMe access engine 106 of the NVMe controller 102 is configured to export and present the NVMe namespaces and logical volumes of the remote physical storage devices 122 to the VMs 110 running on the host 112 as accessible storage devices that are no different from those locally connected storage devices 120. The actual mapping, expansion, and operations on the remote storage devices 122 over the network using iSCSI-like storage network protocol performed by the NVMe controller 102 are transparent to the VMs 110, which provides the instructions on the logical volumes that map to the remote storage volumes.

Figure 4:
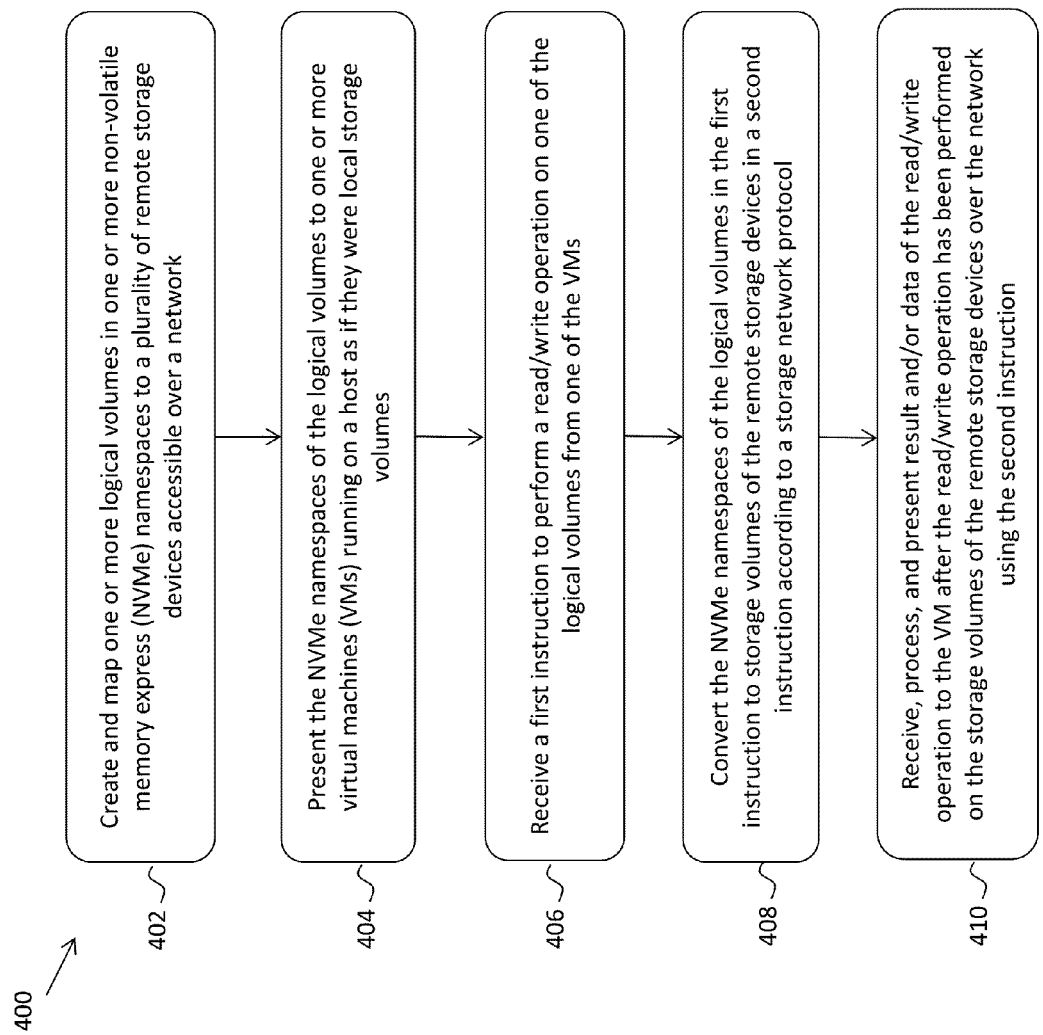
FIG. 4 depicts a flowchart of an example of a process to support virtualization of remote storage devices to be presented as local storage devices to VMs in accordance with some embodiments.

FIG. 4 depicts a flowchart of an example of a process to support virtualization of remote storage devices to be presented as local storage devices to VMs. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where one or more logical volumes in one or more NVMe namespaces are created and mapped to a plurality of remote storage devices accessible over a network. The flowchart 400 continues to block 404, where the NVMe namespaces of the logical volumes are presented to one or more virtual machines (VMs) running on a host as if they were local storage volumes. The flowchart 400 continues to block 406, where a first instruction to perform a read/write operation on one of the logical volumes mapped to the remote storage devices is received from one of the VMs. The flowchart 400 continues to block 408, where the namespaces of the logical volumes in the first instruction is converted to storage volumes of the remote storage devices in a second instruction according to a storage network protocol. The flowchart 400 ends at block 410, where result and/or data of the read/write operation performed on the remote storage devices is received, processed and presented to the VM after the read/write operation is performed on the storage volumes of the remote storage devices over the network using the second instruction.

Figure 5:
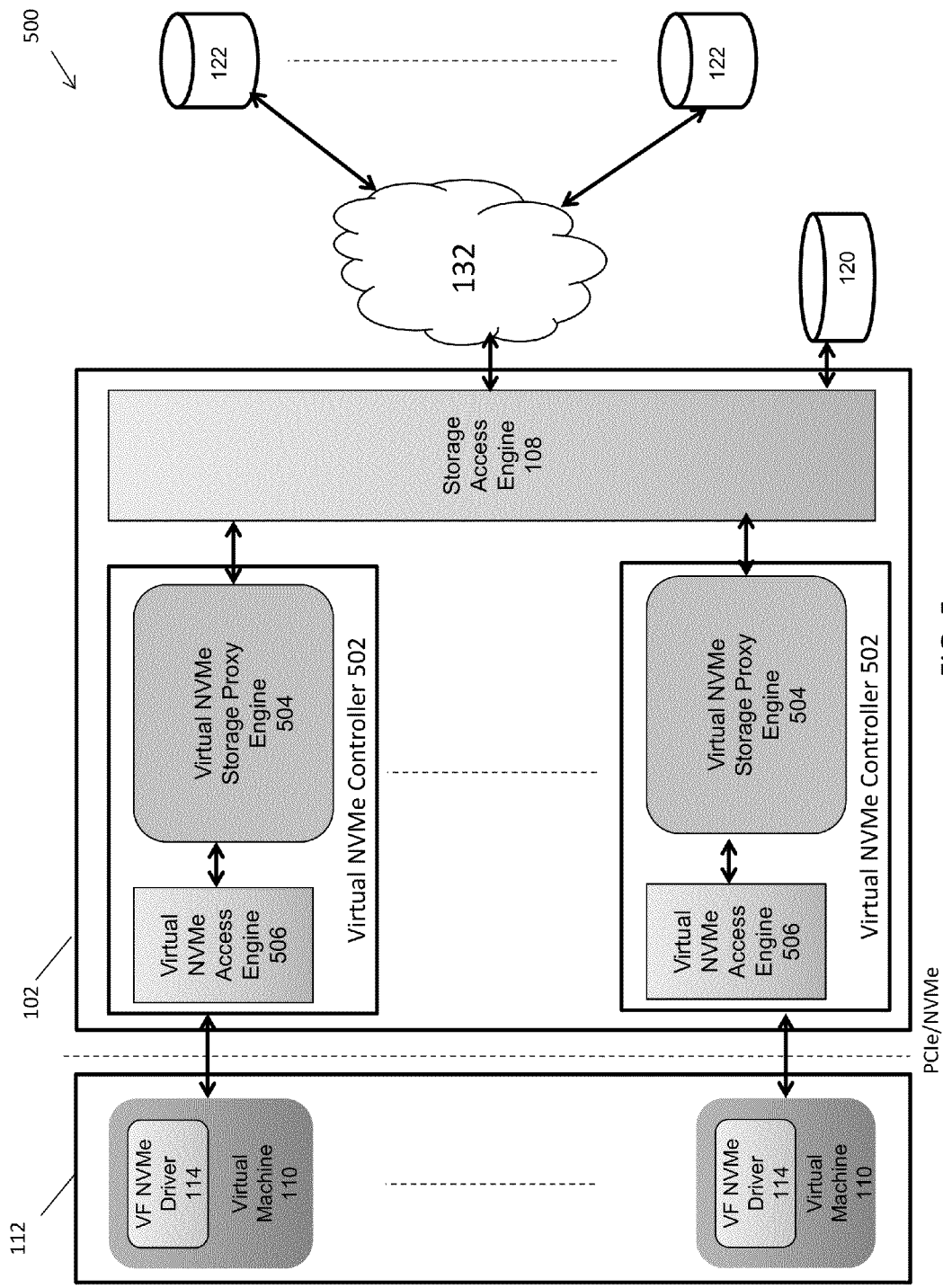
FIG. 5 depicts a non-limiting example of a diagram of a system to support virtualization of a plurality of remote storage devices to be presented as local storage devices to VMs, wherein the physical NVMe controller further includes a plurality of virtual NVMe controllers in accordance with some embodiments.

FIG. 5 depicts a non-limiting example of a diagram of system 500 to support virtualization of remote storage devices as local storage devices for VMs, wherein the physical NVMe controller 102 further includes a plurality of virtual NVMe controllers 502. In the example of FIG. 5, the plurality of virtual NVMe controllers 502 run on the single physical NVMe controller 102 where each of the virtual NVMe controllers 502 is a hardware accelerated software engine emulating the functionalities of an NVMe controller to be accessed by one of the VMs 110 running on the host 112. In some embodiments, the virtual NVMe controllers 502 have a one-to-one correspondence with the VMs 110, wherein each virtual NVMe controller 502 interacts with and allows access from only one of the VMs 110. Each virtual NVMe controller 502 is assigned to and dedicated to support one and only one of the VMs 110 to access its storage devices, wherein any single virtual NVMe controller 502 is not shared across multiple VMs 110.

In some embodiments, each virtual NVMe controller 502 is configured to support identity-based authentication and access from its corresponding VM 110 for its operations, wherein each identity permits a different set of API calls for different types of commands/instructions used to create, initialize and manage the virtual NVMe controller 502, and/or provide access to the logic volume for the VM 110. In some embodiments, the types of commands made available by the virtual NVMe controller 502 vary based on the type of user requesting access through the VM 110 and some API calls do not require any user login. For a non-limiting example, different types of commands can be utilized to initialize and manage virtual NVMe controller 502 running on the physical NVMe controller 102.

As shown in the example of FIG. 5, each virtual NVMe controller 502 may further include a virtual NVMe storage proxy engine 504 and a virtual NVMe access engine 506, which function in a similar fashion as the respective NVMe storage proxy engine 104 and a NVMe access engine 106 discussed above. In some embodiments, the virtual NVMe storage proxy engine 504 in each virtual NVMe controller 502 is configured to access both the locally attached storage devices 120 and remotely accessible storage devices 122 via the storage access engine 108, which can be shared by all the virtual NVMe controllers 502 running on the physical NVMe controller 102.

During operation, each virtual NVMe controller 502 creates and maps one or more logical volumes in one or more NVMe namespaces mapped to a plurality of remote storage devices accessible over a network. Each virtual NVMe controller 502 then presents the NVMe namespaces of the logical volumes to its corresponding VM 110 as if they were local storage volumes. When a first instruction to perform a read/write operation on the logical volumes is received from the VM 110, the virtual NVMe controller 502 converts the NVMe namespaces of the logical volumes in the first instruction to storage volumes of the remote storage devices in a second instruction according to a storage network protocol. The virtual NVMe controller 502 presents result and/or data of the read/write operation to the VM 110 after the read/write operation has been performed on the storage volumes of the remote storage devices over the network using the second instruction.

In some embodiments, each virtual NVMe controller 502 depicted in FIG. 5 has one or more pairs of submission queue 212 and completion queue 214 associated with it, wherein each queue can accommodate a plurality of entries of instructions from one of the VMs 110. As discussed above, the instructions in the submission queue 212 are first fetched by the NQM 204 from the memory 210 of the host 112 to the waiting buffer 218 of the NVMe processing engine 202 as discussed above. During its operation, each virtual NVMe controller 502 retrieves the instructions from its corresponding VM 110 from the waiting buffer 218 and converts the instructions according to the storage network protocol in order to perform a read/write operation on the data stored on the local storage devices 120 and/or remote storage devices 122 over the network by invoking VF functions provided by the physical NVMe controller 102. During the operation, data is transmitted to or received from the local/remote storage devices in the logical volume of the VM 110 via the interface to storage access engine 108. Once the operation has been processed, the virtual NVMe controller 502 saves the status of the executed instructions in the waiting buffer 218 of the processing engine 202, which are then placed into the completion queue 214 by the NQM 204. The data being processed by the instructions of the VMs 110 is also transferred between the data buffer 216 of the memory 210 of the host 112 and the memory 208 of the NVMe processing engine 202.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support remote storage virtualization, comprising:
   a non-volatile memory express (NVMe) storage proxy engine running on a physical NVMe controller, which in operation, is configured to:
      create and map one or more logical volumes in one or more non-volatile memory express (NVMe) namespaces to a plurality of remote storage devices accessible over a network;
      convert the NVMe namespaces of the logical volumes in a first instruction to storage volumes of the remote storage devices in a second instruction according to a storage network protocol, wherein the first instruction performs a read/write operation on the logical volumes;
   an NVMe access engine running on the physical NVMe controller, which in operation, is configured to
      present the NVMe namespaces of the logical volumes to one or more virtual machines (VMs) running on a host as local storage volumes;
      receive said first instruction to perform the read/write operation on the logical volumes from one of the VMs;
      present result and/or data of the read/write operation to the VM after the read/write operation has been performed on the storage volumes of the remote storage devices over the network using the second instruction.

2. The system of claim 1, wherein:
the host of the VMs is an x86/ARM server.

3. The system of claim 1, wherein:
the logical volume further includes storage devices attached to the physical NVMe controller locally.

4. The system of claim 1, wherein:
the physical NVMe controller connects to the host via a Peripheral Component Interconnect Express (PCIe)/NVMe link.

5. The system of claim 1, wherein:
the physical NVMe controller provides both Physical Functions (PFs) and Virtual Functions (VFs) to support the engines running on it.

6. The system of claim 1, wherein:
the physical NVMe controller further includes:
   an NVMe queue manager (NQM) configured to manage a plurality of queues that process the instructions from the VMs;
   a processing engine that includes at least a memory unit and a processor configured to process the instructions in the queues;
   an interface to storage devices locally coupled to the physical NVMe controller;
   a network driver that enables access to the remote storage devices accessible over the network.

7. The system of claim 1, wherein:
the VMs run independently on the host and are isolated from each other so that one VM cannot access the data and/or communication of any other VMs running on the same host.

8. The system of claim 1, wherein:
the storage network protocol is Internet Small Computer System Interface (iSCSI).

9. The system of claim 1, wherein:
the one or more NVMe namespaces are provided to the VMs to perform the read/write operation.

10. The system of claim 1, wherein:
multiple of the plurality of VMs are enabled to access the same logical volume and each logical volume is enabled to be shared among the multiple VMs.

11. The system of claim 1, wherein:
the NVMe storage proxy engine is configured to establish a lookup table that maps between the NVMe namespaces of the logical volumes and the remote physical storage volumes.

12. The system of claim 1, wherein:
the NVMe storage proxy engine is configured to expand mappings between the NVMe namespaces of the logical volumes and the remote physical storage devices/volumes to add additional storage volumes on demand.

13. The system of claim 1, wherein:
the NVMe storage proxy engine is configured to perform the mapping and the operations on the remote storage devices over the network transparent to the VMs, which provides the first instructions on the logical volumes.

14. A system to support remote storage virtualization, comprising:
   a plurality of non-volatile memory express (NVMe) virtual controllers running on a physical NVMe controller, wherein each of the NVMe virtual controllers is configured to:
      create and mapping one or more logical volumes in one or more non-volatile memory express (NVMe) namespaces to a plurality of remote storage devices accessible over a network;
      present the NVMe namespaces of the logical volumes to a virtual machine (VM) running on a host as if they were local storage volumes;
      receive a first instruction to perform a read/write operation on the logical volumes from the VM;
      convert the NVMe namespaces of the logical volumes in the first instruction to storage volumes of the remote storage devices in a second instruction according to a storage network protocol;
      present result and/or data of the read/write operation to the VM after the read/write operation has been performed on the storage volumes of the remote storage devices over the network using the second instruction.

15. The system of claim 14, wherein:
each of the virtual NVMe controllers is configured to interact with and allow access from one and only one VM.

16. The system of claim 14, wherein:
each of the VMs running on the host has an NVMe driver configured to interact with the physical NVMe controller and the virtual NVMe controllers via the PCIe/NVMe connection.

17. The system of claim 14, wherein:
each of the virtual NVMe controllers is configured to support identity-based authentication and access from its corresponding VM for its operations, wherein each identity permits a different set of API calls for different types of commands used to create, initialize and manage the virtual NVMe controller and/or provide access to the logical volumes for the VM.

18. A computer-implemented method to support remote storage virtualization, comprising:
creating and mapping one or more logical volumes in one or more non-volatile memory express (NVMe) namespaces to a plurality of remote storage devices accessible over a network;
presenting the NVMe namespaces of the logical volumes to one or more virtual machines (VMs) running on a host as if they were local storage volumes;
receiving a first instruction to perform a read/write operation on the logical volumes from one of the VMs;
converting the NVMe namespaces of the logical volumes in the first instruction to storage volumes of the remote storage devices in a second instruction according to a storage network protocol;
receiving, processing, and presenting result and/or data of the read/write operation to the VM after the read/write operation has been performed on the storage volumes of the remote storage devices over the network using the second instruction.

19. The method of claim 18, further comprising:
including storage devices attached to the physical NVMe controller locally in the logical volume.

20. The method of claim 18, further comprising:
connecting the physical NVMe controller to the host via a Peripheral Component Interconnect Express (PCIe)/NVMe link.

21. The method of claim 18, further comprising:
enabling the VMs to run independently on the host and isolating the VMs from each other so that one VM cannot access the data and/or communication of any other VMs running on the same host.

22. The method of claim 18, further comprising:
enabling multiple of the plurality of VMs to access the same logical volume and each logical volume to be shared among the multiple VMs.

23. The method of claim 18, further comprising:
establishing a lookup table that maps between the NVMe namespaces of the logical volumes and the remote physical storage volumes.

24. The method of claim 18, further comprising:
expanding mappings between the NVMe namespaces of the logical volumes and the remote physical storage devices/volumes to add additional storage volumes on demand.

25. The method of claim 18, further comprising:
performing the mapping and the operations on the remote storage devices over the network transparent to the VMs, which provides the first instructions on the logical volumes.

26. A computer-implemented method to support remote storage virtualization, comprising:
creating one or more logical volumes in one or more non-volatile memory express (NVMe) namespaces mapped to a plurality of remote storage devices accessible over a network via an NVMe virtual controller running on a physical NVMe controller;
presenting the NVMe namespaces of the logical volumes to a virtual machine (VM) running on a host as local storage volumes;
receiving a first instruction to perform a read/write operation on the logical volumes from the VM;
converting the NVMe namespaces of the logical volumes in the first instruction to storage volumes of the remote storage devices in a second instruction according to a storage network protocol;
presenting result and/or data of the read/write operation to the VM after the read/write operation has been performed on the storage volumes of the remote storage devices over the network using the second instruction.

27. The method of claim 26, further comprising:
enabling the virtual NVMe controller to interact with and allow access from one and only one VM.

28. The method of claim 26, further comprising:
supporting identity-based authentication and access by each of the virtual NVMe controllers from its corresponding VM for its operations, wherein each identity permits a different set of API calls for different types of commands used to create, initialize and manage the virtual NVMe controller and/or provide access to the logical volumes for the VM.

* * * * *

UNITED STATES PATENT AND TRADEMARK OFFICE
CERTIFICATE OF CORRECTION

PATENT NO. : 9,294,567 B2
APPLICATION NO. : 14/300552
DATED : March 22, 2016
INVENTOR(S) : Muhammad Raghib Hussain et al.

It is certified that error appears in the above-identified patent and that said Letters Patent is hereby corrected as shown below:

Claims

In Column 9, line 53, claim 3, delete "volume" and insert -- volumes --, therefor, In Column 9, line 53, claim 3, delete "includes" and insert -- include a --, therefor, In Column 9, line 53, claim 3, delete "devices" and insert -- device --, therefor, In Column 10, line 38, claim 13, delete "VMs" and insert -- VM --, therefor, In Column 11, line 35, claim 19, insert -- a -- between "including" and "storage", In Column 11, line 35, claim 19, delete "devices" and insert -- device --, therefor, In Column 11, line 36, claim 19, delete "volume" and insert -- volumes --, therefor, In Column 12, line 12, claim 25, delete "VMs" and insert -- VM --, therefor.

Signed and Sealed this
Twenty-sixth Day of July, 2016

Michelle K. Lee
*Director of the United States Patent and Trademark Office*